US012395497B2

(12) United States Patent
Jolly et al.

(10) Patent No.: US 12,395,497 B2
(45) Date of Patent: *Aug. 19, 2025

(54) EVENT VERIFICATION ENGINE (71) Applicant: Snapwise Inc., Kitchener (CA)

(72) Inventors: Sukhsagar Jolly, Brampton (CA); Jan Kulinski, Mississauga (CA); Guy Streetley, Kitchener (CA)

(73) Assignee: SNAPWISE INC., Kitchener (CA)

( * ) Notice: Subject to any disclaimer, the term of this patent is extended or adjusted under 35 U.S.C. 154(b) by 325 days.

This patent is subject to a terminal disclaimer.

(21) Appl. No.: 18/088,670

(22) Filed: Dec. 26, 2022

(65) Prior Publication Data

US 2023/0140529 A1    May 4, 2023

Related U.S. Application Data (63) Continuation of application No. 16/369,001, filed on Mar. 29, 2019, now Pat. No. 11,539,712.

(60) Provisional application No. 62/649,681, filed on Mar. 29, 2018.

(51) Int. Cl.
| | |
|---|---|
| *H04L 9/40* | (2022.01) |
| *G06Q 10/0631* | (2023.01) |
| *G06Q 50/00* | (2012.01) |
| *G08B 27/00* | (2006.01) |
| *H04N 7/18* | (2006.01) |
| *G06Q 30/018* | (2023.01) |
| *G06V 30/413* | (2022.01) |

(52) U.S. Cl.
CPC .... *H04L 63/123* (2013.01); *G06Q 10/063112* (2013.01); *G06Q 50/01* (2013.01); *G08B 27/001* (2013.01); *H04N 7/185* (2013.01); *G06Q 30/018* (2013.01); *G06V 30/413* (2022.01)

(58) Field of Classification Search
CPC ............... H04L 63/123; H04L 63/0227; H04L 63/1425; G06Q 10/063112; G06Q 50/01; G06Q 30/018; G08B 27/001; H04N 7/185; H04N 7/18; G06V 30/413; G06V 20/41; G06V 20/44; H04W 12/63
See application file for complete search history.

(56) References Cited

U.S. PATENT DOCUMENTS

| | | | |
|---|---|---|---|
| 9,569,467 B1* | 2/2017 | Schechter | G06F 16/27 |
| 10,497,071 B2* | 12/2019 | Gosink | G06Q 50/06 |
| 10,856,115 B2* | 12/2020 | Gauglitz | G06F 3/0482 |

(Continued)

*Primary Examiner* — Dhaval V Patel
(74) *Attorney, Agent, or Firm* — Thomas | Horstemeyer, LLP (57) ABSTRACT

A computer system for verifying information relating to an event. The computer system includes a network interface and a processor to receive a media feed containing information related to a potential event, identify the potential event and determine a location of the potential event from the information in the media feed, and solicit verification of information relating to the potential event from a set of responder devices of a plurality of responder devices. Each responder device of the set of responder devices has a location-tracking device, and each responder device of the set of responder devices is selected from a pool of responder devices in a vicinity of the potential event. The processor is further to determine whether information in the media feed is verified by verification solicited from the set of responder devices and output the determination.

21 Claims, 9 Drawing Sheets

(56) References Cited

U.S. PATENT DOCUMENTS

| | | |
|---|---|---|
| 2007/0262857 A1 | 11/2007 | Jackson |
| 2011/0066743 A1 | 3/2011 | Hurley |
| 2013/0073389 A1* | 3/2013 | Heath .................... G06Q 30/02 705/14.54 |
| 2013/0081032 A1 | 3/2013 | Levien |
| 2013/0226926 A1 | 8/2013 | Beaurepaire |
| 2014/0081882 A1 | 3/2014 | Govindaraman |
| 2015/0020174 A1 | 1/2015 | St. Clair |
| 2016/0292509 A1 | 10/2016 | Kaps |
| 2017/0078621 A1 | 3/2017 | Sahay |
| 2017/0178175 A1 | 6/2017 | Levein |
| 2017/0264604 A1 | 9/2017 | Drako |
| 2019/0107845 A1 | 4/2019 | Kaine |

\* cited by examiner

FIG. 9

EVENT VERIFICATION ENGINE

CROSS REFERENCE TO RELATED APPLICATIONS

This application is a continuation of U.S. Non-Provisional patent application Ser. No. 16/369,001, filed Mar. 29, 2019, which claims priority to US Provisional Patent Application No. 62/649,681, filed Mar. 29, 2018, all of which are hereby incorporated by reference in their entireties.

FIELD

The present disclosure relates to computer information systems, and in particular to the verification of information distributed by computer information systems.

BACKGROUND

Computer information systems are systems composed of computing devices which may be used to record, distribute, and consume information. Some of the information circulating in such computer information systems may be factually inaccurate. Factually inaccurate information may be corrected by fact-checking whereby an individual analyses and interprets the information and makes a determination regarding its factuality. As the amount of information circulating within computer information systems increases, verifying the accuracy of the information therein becomes increasingly challenging, particularly where the information circulated within the computer information systems relate to facts external to the computer information system itself.

SUMMARY

According to an aspect of the specification, a computer system for verifying information relating to an event includes a network interface in communication with a plurality of responder devices via a computer network and a non-transitory storage medium. The non-transitory storage medium includes instructions that when executed cause a processor to receive a media feed containing information related to a potential event, identify the potential event and determine a location of the potential event from the information in the media feed, and solicit verification of information relating to the potential event from a set of responder devices of the plurality of responder devices. Each responder device of the set of responder devices has a location-tracking device, and each responder device of the set of responder devices selected from a pool of responder devices in a vicinity of the potential event. The instructions further cause the processor to determine whether information in the media feed is verified by verification solicited from the set of responder devices and output the determination.

The processor may detect anomalous media activity in the media feed and aggregate like media to identify the potential event. The media feed may include a media post, and the processor is to ascertain a headline from the media post to aggregate like media to identify the potential event. The media feed may include a media post, and the processor is to ascertain a potential location from the media post to determine the location of the potential event.

The processor may be to generate a request to verify the information in the media feed, transmit the request to the set of responder devices, and receive responses to the request from the set of responder devices, the responses to confirm or disconfirm information related to the potential event.

A first responder device of the set of responder devices may include an image-capture device, the request may include a request to capture an image of the potential event, and the responses may include a captured image, the captured image to confirm or disconfirm information related to the potential event.

The processor may be to identify the pool of responder devices in the vicinity of the potential event, filter ineligible responders from the pool of responder devices to generate a set of eligible responder devices, and bundle a cohort of eligible responder devices from the set of eligible responder devices for inclusion in the set of responder devices solicited for verification of information.

According to another aspect of the specification, a method for verifying information relating to an event involves receiving a media feed containing information related to a potential event, identifying the potential event from the information in the media feed, and determining a location of the potential event from the information in the media feed. The method further involves soliciting verification of information relating to the potential event from a set of responder devices of a plurality of responder devices, each responder device of the set of responder devices having a location-tracking device, each responder device of the set of responder devices selected from a pool of responder devices in a vicinity of the potential event. The method further involves determining whether information in the media feed is verified by verification solicited from the set of responder devices and outputting the determination.

The method may involve detecting anomalous media activity in the media feed and aggregate like media to identify the potential event. The media feed may include a media post, and the method may further involve ascertaining a headline from the media post to aggregate like media to identify the potential event. The media feed may include a media post, and the method may further involve ascertaining a potential location from the media post to determine the location of the potential event.

The method may involve generating a request to verify the information in the media feed, transmitting the request to the set of responder devices, and receiving responses to the request from the set of responder devices, the responses to confirm or disconfirm information related to the potential event.

A first responder device of the set of responder devices may include an image-capture device, the request may include a request to capture an image of the potential event, and the responses may include a captured image, the captured image to confirm or disconfirm information related to the potential event.

The method may involve identifying the pool of responder devices in the vicinity of the potential event, filtering ineligible responders from the pool of responder devices to generate a set of eligible responder devices, and bundling a cohort of eligible responder devices from the set of eligible responder devices for inclusion in the set of responder devices solicited for verification of information.

According to another aspect of the specification, a non-transitory machine-readable storage medium includes instructions that when executed cause a processor of a computing device to provide an indication of a location of the computing device to an event verification server, receive a request from an event verification server to verify information related to a potential event in a vicinity of the computing device, and transmit a response to the event verification server, the response to confirm or disconfirm the information related to the potential event.

The computing device may include a display device, and the instructions may cause the processor to display a potential location of the potential event and a solicitation to verify information related to the potential event at the display device.

The computing device may include an image-capture device, and the instructions may cause the processor to cause the image-capture device to capture an image of the potential event and transmit the image to the event verification server.

BRIEF DESCRIPTION OF THE DRAWINGS

Non-limiting embodiments will now be described, by way of example only, with reference to the attached Figures, wherein.

DETAILED DESCRIPTION

Since the advent of the internet, and in particular since the advent of social media, our ability to generate and disseminate news media has become increasingly more accessible and widespread. Traditional media outlets have leveraged the vast communication network provided by the internet to expand their outreach, while individuals have also been able to more easily spread their own ideas and stories, as citizen journalists, or simply as users of social media platforms.

Although the internet and social media notionally improve communication within society, the exceptionally open and viral nature of communication over the internet and social media brings with it the potential for abuse. The barrier to entry to spreading information, whether true or false, is exceedingly low. False news stories including factual inaccuracies or omissions, whether generated with the intent to deceive or not, can pass as credible. Electronic media, including images, videos, and sound recordings can be maliciously doctored and passed off as being genuine. Media outlets are under increasing pressure to be the first to report on a story, lest a competing media outlet capture the attention first, and to report the most provocative version of the story, to generate the most interest, discussion, and spread. As a result, accuracy and fact-checking is too often compromised.

One problem contributing to the spread of misinformation online is that the vast majority of media consumers are remote from the actual event being reported, and have no way to independently verify the accuracy of the information being disseminated. Thus, there is a need for a system for obtaining independent verification of information being disseminated online by reliable sources.

Accordingly, this disclosure provides a system for verifying information relating to an event, including a plurality of responder devices, each responder device having a location-tracking device, and an event verification server having a network interface in communication with the plurality of responder devices via a computer network, a memory for storing programming instructions, and a processor in communication with the network interface and the memory. The processor is configured to solicit verification of information relating to a potential event from a set of responder devices selected from a pool of responder devices of the plurality of responder devices in a vicinity of the potential event.

The system facilitates performance of a method for verifying information relating to an event, which involves receiving media feeds, identifying a potential event from the media feeds and a location of the potential event, generating a request to solicit information relating to the potential event for transmission to a selection of responders, selecting a selection of responders from a pool of responders in a vicinity of the location of the potential event, transmitting the request to the selection of responders, and receiving responses to the request from the selection of responders, where the responses confirm or disconfirm the information relating to the event. The method may be instantiated in a non-transitory machine-readable medium executable by a processor of a computing device.

Figure 1:
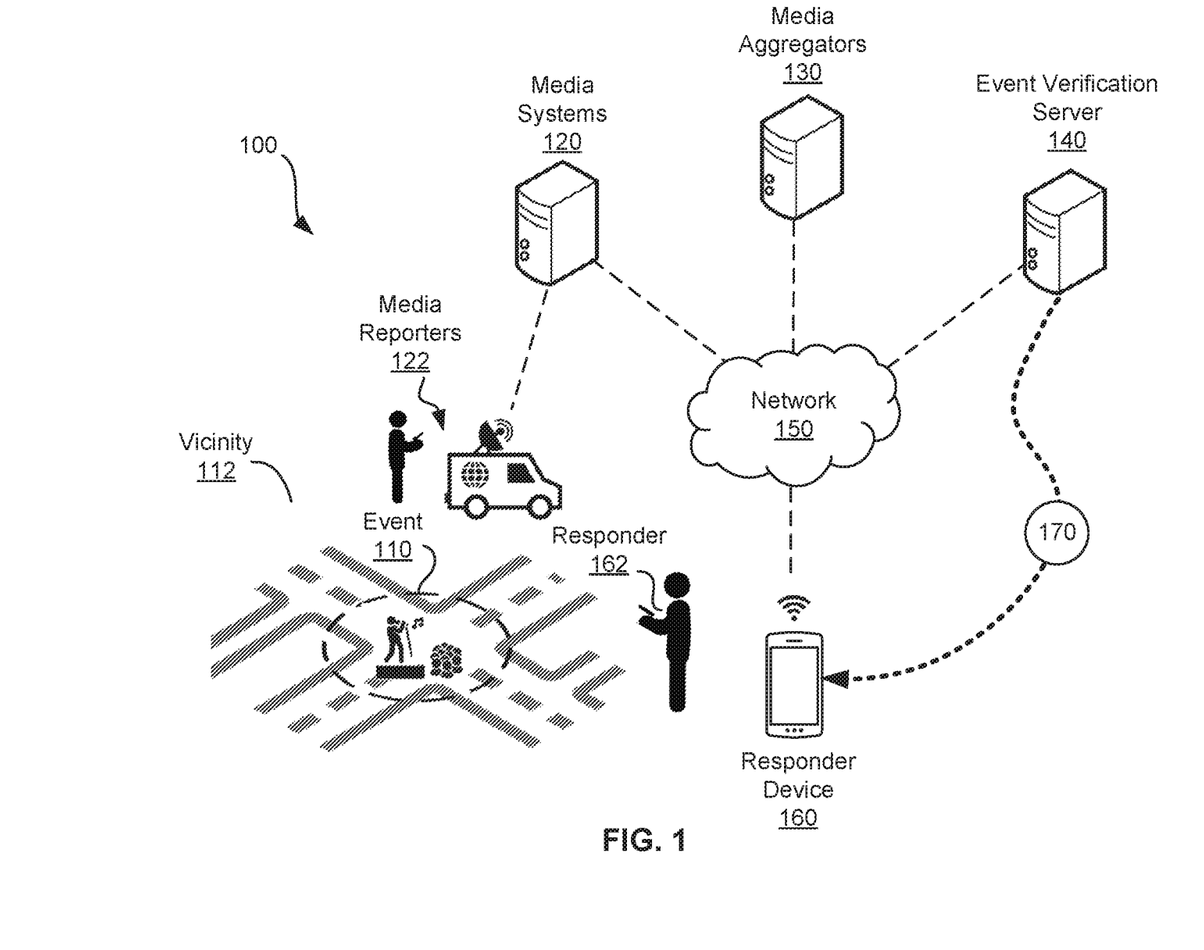
FIG. 1 is a schematic diagram of a system for verifying information relating to an event, according to a non-limiting embodiment.

FIG. 1 is a schematic diagram of a system for verifying information relating to an event, the system indicated generally at 100, according to a non-limiting embodiment. The system 100 includes an event 110 where activities are taking place and information is being generated. In the present example, the event 110 includes a musician delivering an impromptu concert at an intersection in a city. Within a vicinity 112 of the event 110, media reporters 122 are observing the event 110 and reporting on the event 110 to associated media systems 120. Also in the vicinity 112 is a responder 162 wielding a responder device 160, but the responder 162 may or may not necessarily be observing the event 110. The responder 162 is a user of a computer program, such as a software application, which enables communication with an event verification server 140, as discussed herein. Although a single responder device 160 and responders 162 are shown, it is understood that a plurality of responder devices 160 and responders 162 can be included in system 100.

The media systems 120 operate to compile information and disseminate news media in various ways. Media systems 120 can include traditional media outlet systems which deliver news to consumers through television, radio, print media, or online content. In the present example, the media systems 120 include at least one media outlet which posts news reports online. Media systems 120 also can also include social media platforms where social media users can generate content, share user-generated content, and share content generated elsewhere online. Furthermore, media systems 120 can include raw information providers, such as meteorological data providers which provide whether information, and geological data providers which provide seismic activity information, and the like. Furthermore, media systems 120 can include any other source of event-related information online, including online organization platforms such as EVENTBRITE™ or MEETUP™.

The system 100 further includes media aggregators 130, which provide partly categorized media information through an Application Programming Interface (API) or other technical means. For example, media aggregators 130 may aggregate news stories, such as those posted by media systems 120 online. Such media aggregators 130 include may combine other media feeds in an attempt to aggregate like media stories surrounding particular topics and events.

The system 100 further includes an event verification server 140, which runs a verification engine which is operable to perform the methods described herein for verifying information relating to event 110. Briefly, the event verification server 140 generates and transmits requests 170 to responder devices 160, the requests 170 soliciting information to verify information related to the event 110.

The media systems 120, media aggregators 130, event verification server 140, and responder device 160 are in communication over one or more computer networks, indicated as network 150. The network 150 can include the internet, a Wi-Fi network, a local-area network, a wide-area network (WAN), a wireless cellular data network, a virtual private network (VPN), a mesh network, a combination of such, and similar.

The media systems 120, media aggregators 130, and event verification server 140, each include a computing device running a server application with storage, communication, and processing capability. The processing capability can include any quantity and combination of a processor, a central processing unit (CPU), a microprocessor, a microcontroller, a field-programmable gate array (FPGA), and similar. The communication capability can include network interfaces which include programming logic enabling the system or device to communicate over network 150, is configured for bidirectional data communications through the network 150, and accordingly can include a network adaptor and driver suitable for the type of network used. The storage can include memory including volatile storage and non-volatile storage. Volatile storage may include random-access memory (RAM) or similar. Non-volatile storage may include a hard drive, flash memory, and similar. Although depicted as servers in this example embodiment, it is understood that the systems 120, aggregators 130, and server 140 may refer to a combination of computers and/or servers in a computer system, such as in a cloud computing or virtual machine environment.

The responder device 160 includes a mobile computing device having storage, communication, and processing means, and which, in cooperation with event verification engine, executes the methods described herein to verify information relating to the event 110. The responder device 160 includes a graphical display surface, such as an LCD, OLED, or other display, and an input device such as a touchscreen, for displaying and interacting with a user interface and pages of software applications. The responder device 160 includes a processor capable of executing non-transitory machine-readable storage media on which the methods described herein are instantiated. In some embodiments, the responder device 160 may include a smart device such as a smart phone running an operating system such as, for example, ANDROID™, IOS™, WINDOWS MOBILE™, or similar. In some embodiments, the responder device 160 includes an image-capture device such as a camera. In other embodiments, a separate image-capture device may be used by the responder and may transfer its recorded images to the responder device 160 through any suitable wired or wireless connection.

Although the example event 110 described herein is an impromptu concert being delivered by a musician at a particular location in a city, it is emphasized that this example is not limiting, and that a variety of different events having a variety of characteristics can be verified. For example, the event 110 can be pre-scheduled and expected, such as a planned concert or celebration. Further, the event 110 can be in motion and not limited to a particular static location or vicinity, such as a parade moving about a city, or a pipeline leak taking place at one or several locations along the pipeline. Further, the event 110 can be taking place in several discrete locations at once, such as a country-wide protest organized to take place in several different cities on the same date. Further, the event 110 may be understood to have already taken place, and that the systems and methods discussed herein may be used to verify the outcome of such an event, such as to verify the extent of extreme weather damage which was reported to have occurred in an area. Further, it is understood that an event which was reported to have been taking place may not in fact be taking place, and that the systems and methods discussed herein may be used to show that reports of the purported event taking place were false.

Figure 2:
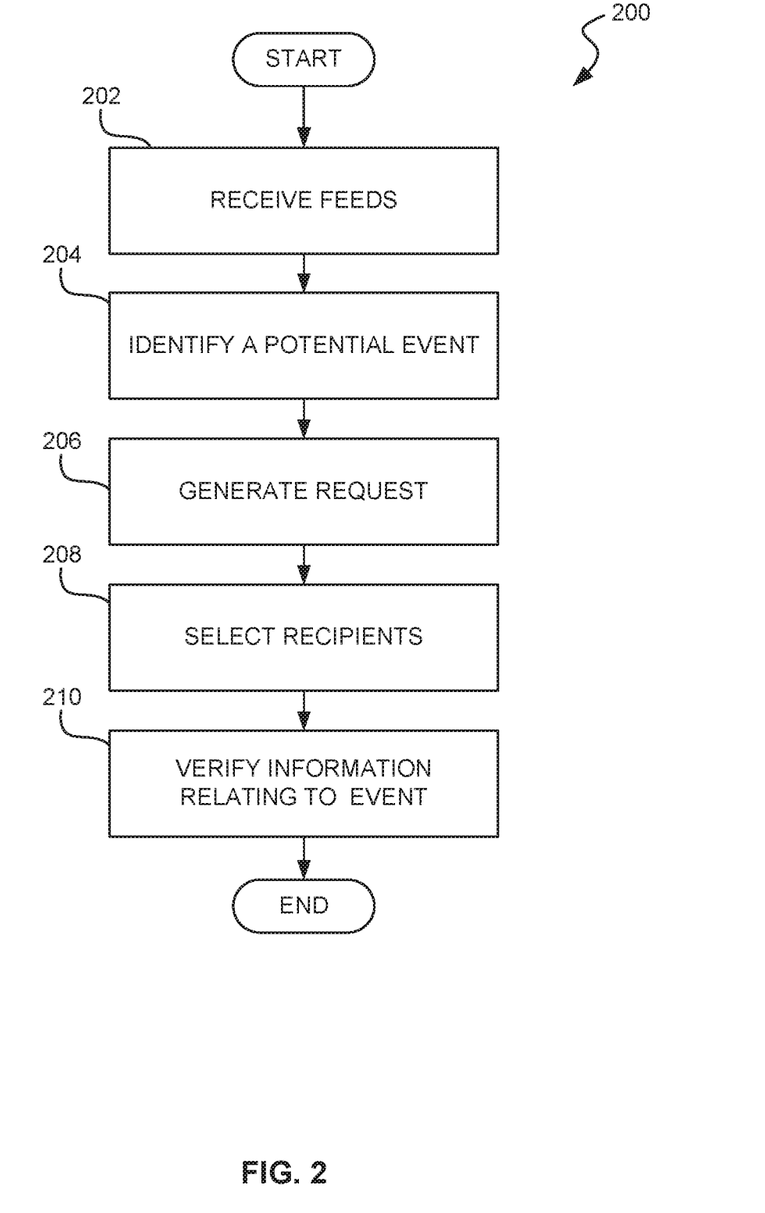
FIG. 2 is a flowchart of a method for verifying information relating to an event, according to a non-limiting embodiment.

Operation of the system 100 is now described with reference to FIG. 2, and with continued reference to FIG. 1. FIG. 2 is a flowchart of a method 200 for verifying information relating to an event, according to a non-limiting embodiment. Although the method 200 may be described as performed by the event verification server 140, this is not limiting, and the method can alternatively be performed by other systems and/or devices. Further, it is to be emphasized, however, that the blocks of method 200 need not be performed in the exact sequence as shown. The method 200 may be instantiated be instantiated in a non-transitory machine-readable storage medium executable by a processor of a computing device.

At block 202, the event verification server 140 receives feeds of media data from media systems 120 and media aggregators 130 over network 150. The media data includes news stories posted to web pages, social media posts, and direct reports of information, such as meteorological data feeds. Such news stories, posts, and reports, include information related to events.

At block 204, the event verification server 140 identifies a potential event. Identification of a potential event generally involves recognizing a single event from various sources in the media feeds received, and is discussed in greater detail in FIG. 7.

At block 206, the event verification server 140 generates a request. The request includes preliminary information relevant to the event 110, and a solicitation for the responder to provide additional information, as described in greater detail with reference to FIGS. 4A-4B.

At block 208, the event verification server 140 selects recipient responder devices 160 to receive the request generated at block 206. Selection of responder devices 160 involves selection of reliable sources, which is described in greater detail in FIG. 8.

At block 210, the event verification server 140 verifies the information relating to the event 110. Verification can include verification of the existence of the event 110, or can include verification of details regarding the event 110. Verification of the occurrence of, and details related to, an event can be provided in several ways, including once a pre-determined threshold of responders in the vicinity 112 of the event 110 provide responses confirming the occurrence of the event 110. After determination of whether the information is verified, an output of the determination may be outputted.

As discussed in greater detail below in FIG. 8, several cohorts of responders can be consulted to provide further responses further assuring that information relating to an event is verified.

It is further contemplated that potential events and details regarding events can be submitted directly by users/responders of the system to event verification server 140, and verified using any of the systems and methods described herein.

Figure 3:
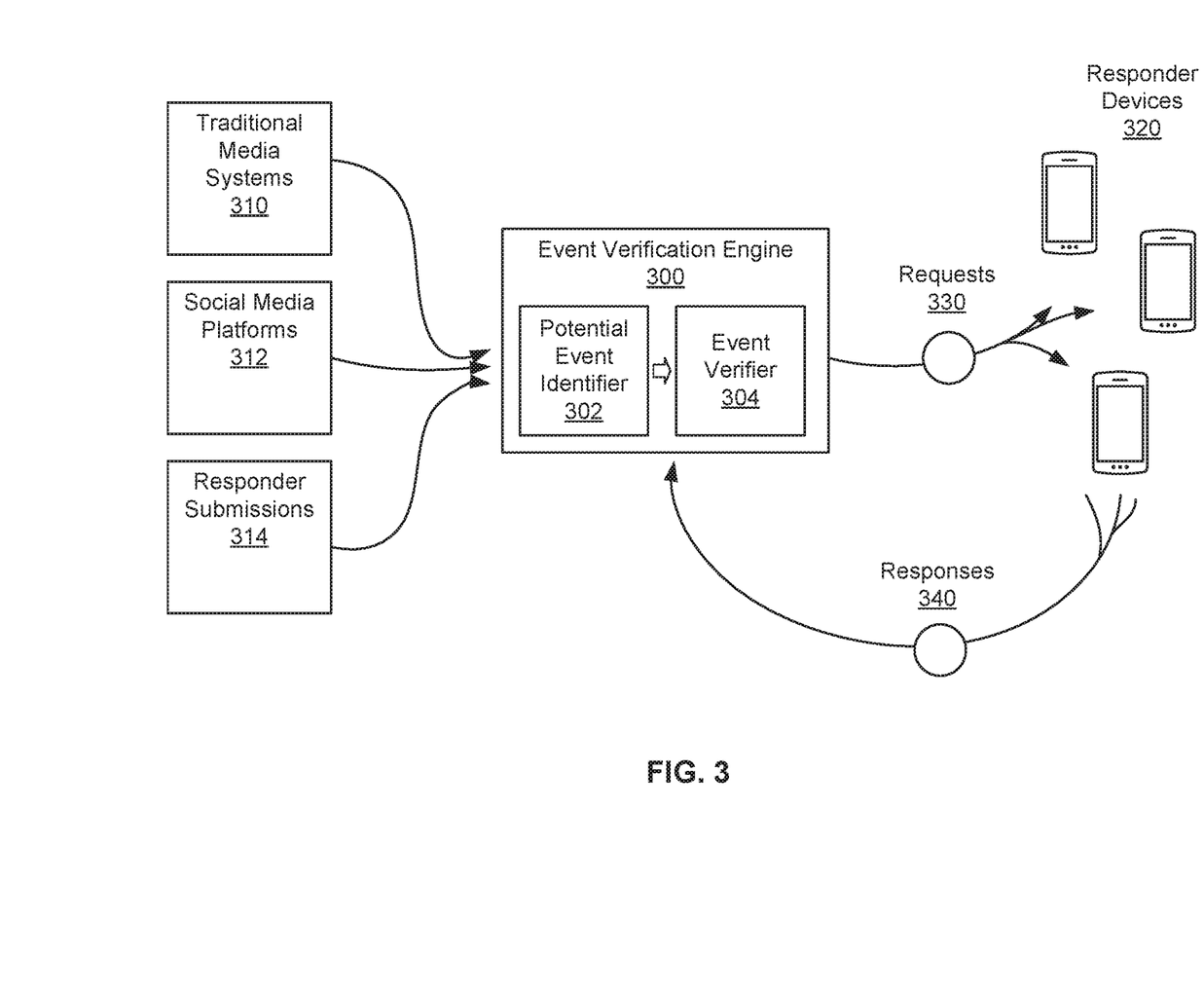
FIG. 3 is a block diagram of a process for verifying information relating to an event using an event verification engine, according to a non-limiting embodiment.

FIG. 3 is a block diagram of a process for verifying information related to an event using an event verification engine 300, according to a non-limiting embodiment. Event verification engine 300 includes functional modules 302 and 304, which include programming instructions for executing the methods discussed throughout this description. Briefly, the event verification engine 300 receives data from traditional media systems 310, social media platforms 312, and responder submissions 314, which include information relating to events. The event verification engine 300 identifies a potential event, generates requests 330 soliciting information related to the potential event, and transmits the requests 330 to a selection of responder devices 320. The responder devices 320 provide responses 340 to the event verification engine 300 for evaluation.

Potential event identifier module 302 can be understood to perform blocks 202 and 204 of method 200. Event verifier module 304 can be understood to perform blocks 206, 208, and 210 of method 200. However, this is not limiting, and different software architecture is contemplated which is capable of executed the methods discussed herein.

Figure 4A:
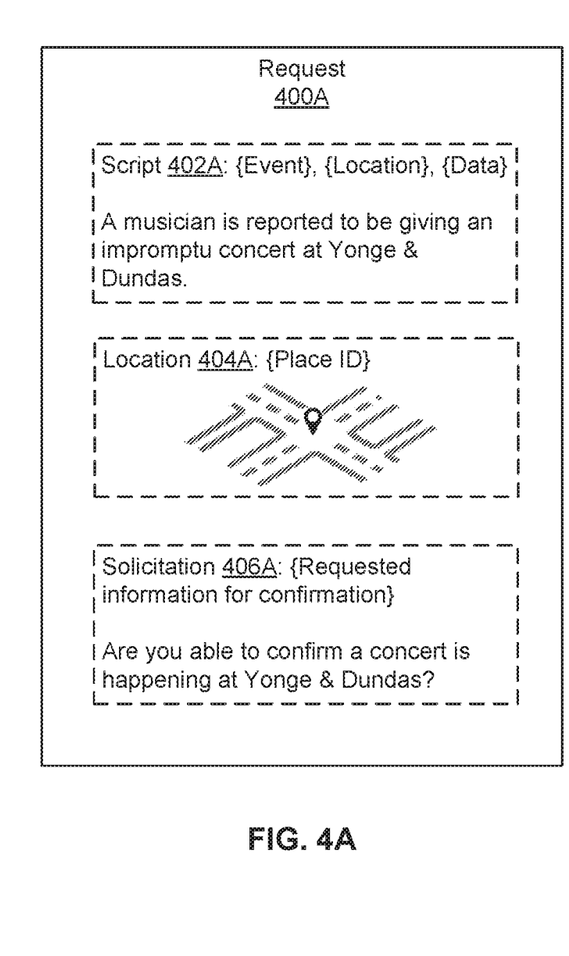
FIG. 4A is a block diagram of a request generated by an event verification server, according to a non-limiting embodiment.

FIG. 4A is a block diagram of a request 400A generated by an event verification server, according to a non-limiting embodiment. The request 400A is viewable via a responder device, such as the responder device 160 described above, running machine-readable instructions designed to handle requests from an event verification server, such as the event verification server 140. The machine-readable instructions may include a software application, browser-embedded software, or operating system-embedded software, firmware, a combination of such, or similar.

The request 400A includes a script 402A, which includes elements of the event, location(s) relevant to the event, and additional data relating to the potential event. The script 402A can be generated according to pre-defined human-readable sentence structures which convey preliminary information relating to a potential event. In other embodiments, the script 402A can be generated according to natural language processing algorithms which synthesize event, location, and other data, into human-readable sentences. Other data can include an image, video, sound recording, news story web page, news article, or other media which is purported to be an accurate depiction of the event, to provide context or comparison to the responder receiving the request. The location data is not limited to the location where the event is currently occurring. For example, location data can include past location data of a moving event, and requests may be generated for responders passing through such areas where the event had previously taken place, so that the responder may provide information relating to the outcome of the event (e.g. weather damage) or any other information which may be gathered at a location where an event had taken place.

The request 400A also includes location indication 404A. Location indication 304A can include a place identifier (Place ID) such as a GOOGLE PLACE™ ID, a set of Global Positioning System (GPS) coordinates, latitude and longitude, geohash, address, postal code, city, or other representation of location, of various granularity. The request 400A can display a visual representation of the location.

The request 400A also includes a solicitation 406A, which includes at least one element of requested information. The solicitation 406A is generated according to pre-defined human-readable sentence structures which solicit a responder to provide information. In other embodiments, the solicitation 406A can be generated according to natural language processing algorithms. The solicitation 406A can include a simple request to confirm a proposed fact, such as, "are you able to confirm a concert is happening at Yonge & Dundas?"

It is emphasized that the arrangement and division of script 402A, location indication 404A, and solicitation 406A, is exemplary only, and that other request formats are contemplated, provided that the request includes a solicitation that a responder provide information and that the request includes sufficient information to enable the responder to fulfill the request.

Figure 4B:
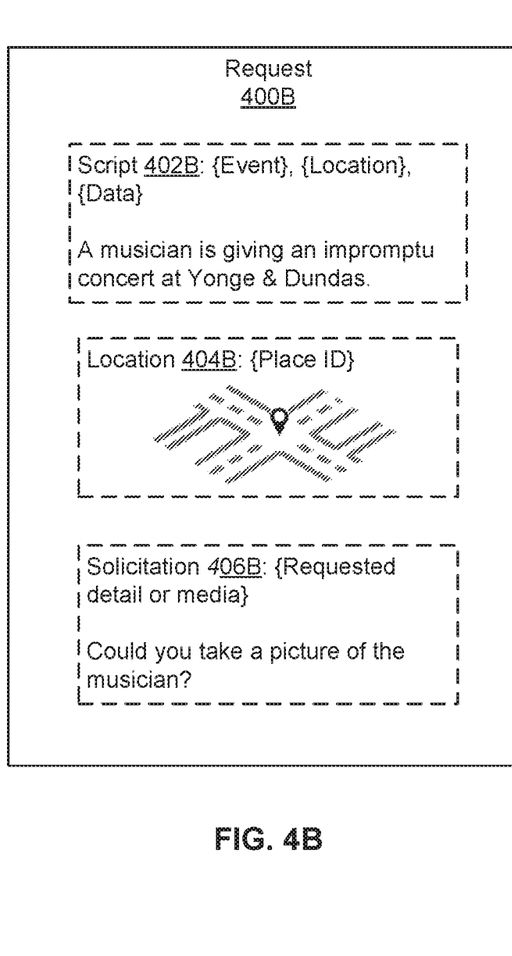
FIG. 4B is a block diagram of another request generated by an event verification server, according to a non-limiting embodiment.

FIG. 4B is a block diagram of a request 400B generated by an event verification server. Description of analogous features 402B, 404B, and 406B, can be had with respect to request 400A of FIG. 4A. The request 400B, however, includes solicitation 406B, which solicits follow-up information including details related to the event, or direct media evidence of the event, rather than merely confirmation of a proposed fact. Using such requests, an event verification server can solicit specific media, such as images, videos, or sound recordings, of the event. An example solicitation includes "Could you take a picture of the musician?".

Thus, requests can be generated based on the identification of potential events detected from media feeds, such as media web pages and social media posts, and the requests can be transmitted to responders which can provide information relating to the event.

In embodiments where potential events are submitted directly by responders of the system, the responder submission can be analyzed in a similar manner to determine factual propositions and locations where such factual propositions may be verified. Furthermore, such requests can include additional information such as the identity or account identifier of the responder who submitted the potential event, a credibility score associated with the responder who submitted the potential event, a location of the responder's responder device when the potential event was submitted, or other information relevant to verifying information relating to the potential event.

In some embodiments, text matter in requests may be translated from the original language in which the potential event was identified to suit the preferences of a responder receiving the request. For example, a potential event may be identified by analysis of several news articles describing an event in English, and a user having a different language preference can receive the script and solicitation in French, Spanish, or any other language of their choosing.

Furthermore, requests may be generated to obtain additional information other than verification of an event or details related to a particular event. Requests may also be generated to obtain updates on changes related to a previously analyzed event. For example, where an impromptu concert, and various surrounding details, have been verified, additional requests may be generated which request updates on whether the concert is ongoing, whether additional musicians have appeared, or other information.

Figure 5:
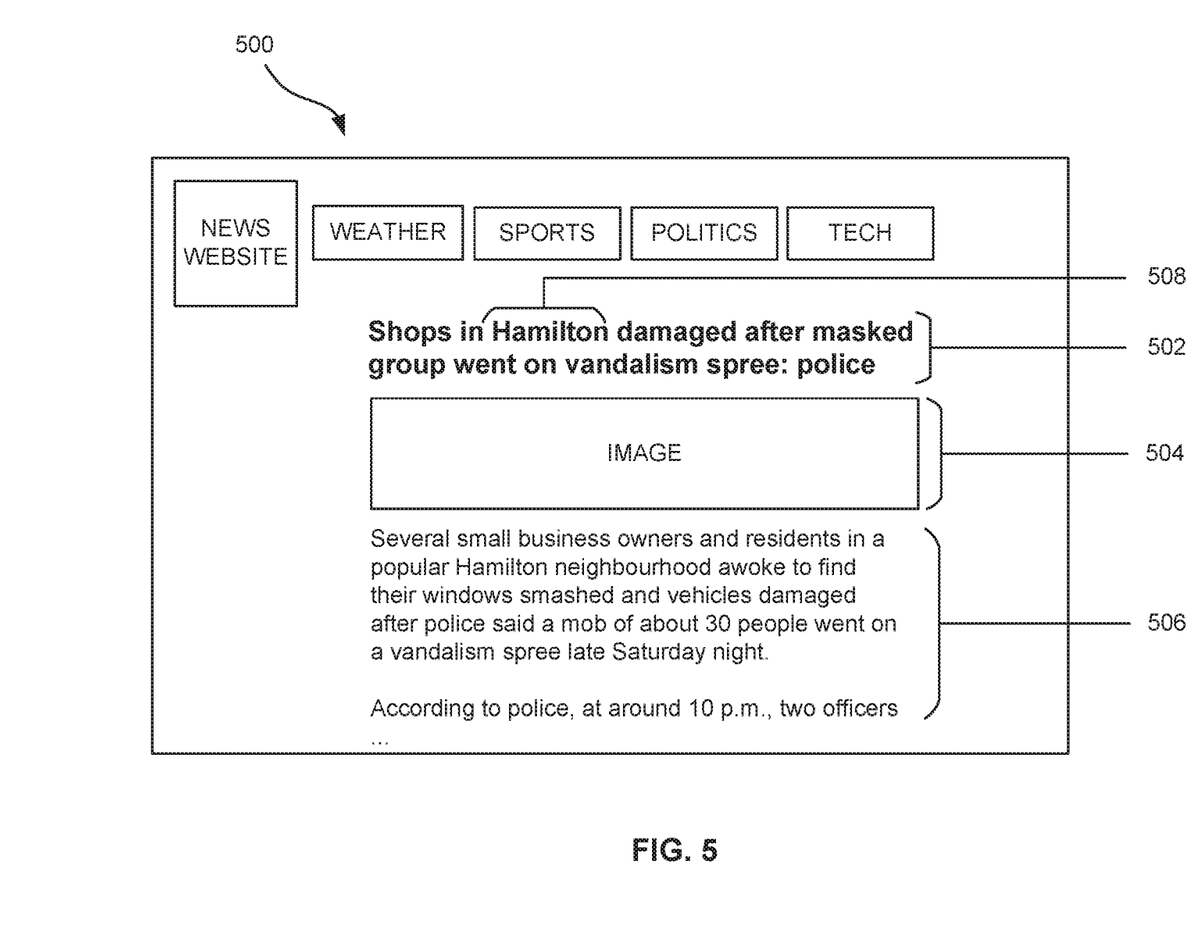
FIG. 5 is a diagram of a media post from a traditional news media outlet webpage, according to a non-limiting embodiment.

FIG. 5 is a diagram of a media post 500 from a traditional news media outlet webpage, according to a non-limiting embodiment. The media post 500 represents a news story posted to a media outlet's web page. The media post 500 includes a headline 502, an image 504, and a text body 506. The media post 500 may also include metadata such as time of posting, author of the report, location of the event, or other information, not shown. A media post such as the media post 500 may be analyzed, such as by the event verification server 140 or a media aggregator 130 of FIG. 1, to identify a potential event as part of a method of verifying information relating to an event, such as the method 200 of FIG. 2.

For example, the headline 502 may be analyzed, including parsing the text of the headline 502 and deconstructing the headline 502 into factual propositions and locations. For example, editorialization can be removed, and factual elements such as parties involved and locations involved can be parsed out. For example, a location 508 can be parsed.

Similar analysis may be conducted on image 504 or text body 506. Feature recognition algorithms can be performed on image 504 to extract information for possible verification. For example, where the media post 500 includes an image of a person's face, a request may be generated asking for verification that that person was indeed present at the potential event. Furthermore, natural language processing can be performed on text body 506 to identify particular factual propositions relating to the potential event which may be designated for verification.

In this manner, several different media posts received from several different sources can be analyzed and categorized into media describing the same event. For example, several different news stories published by several different media outlets may all describe the same event. By analysis, including natural language processing, of the headlines and other information in the media posts, each of the different media posts can be designated as covering a single potential event.

When a sufficient amount of media activity is determined to be covering a single potential event, or when a certain media activity reaches a threshold magnitude of page views or other statistical indications of importance, that single event can be considered a potential event to be verified by an event verification server in cooperation with responder devices in the vicinity of the event.

Figure 6:
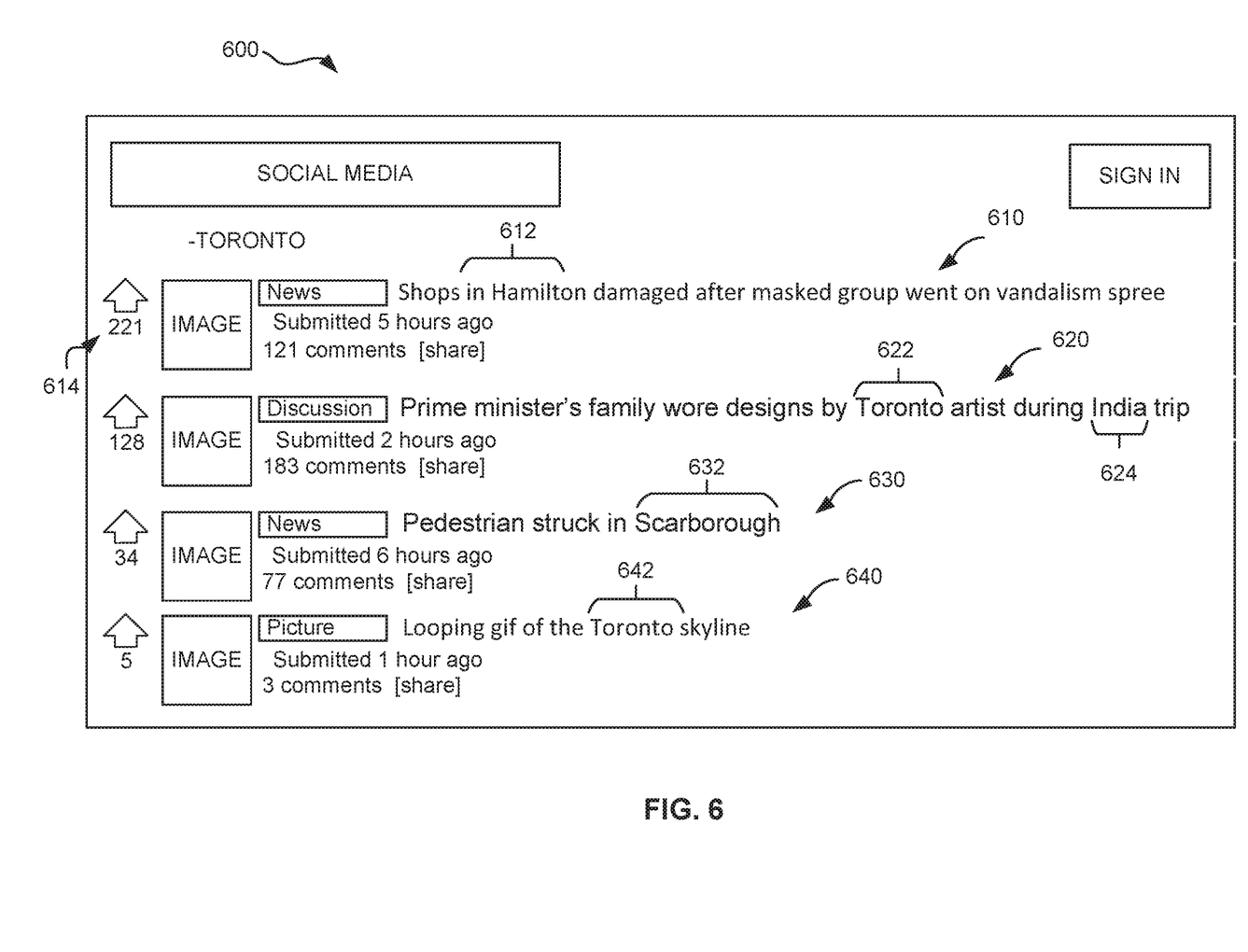
FIG. 6 is a diagram of a forum page from a social media platform listing several social media posts, according to a non-limiting embodiment.

FIG. 6 is a diagram of a forum page 600 from a social media platform listing several social media posts, according to a non-limiting embodiment. The forum page 600 in the present example is a location-based sub-forum for users discussing events or other content related to a particular place, in this case, a city. Forum posts 610, 620, 630, 640 at least notionally relate to topics regarding the city. The forum page 600 can resemble a web aggregator such as REDDIT™, DIGG™, STUMBLEUPON™, 9GAG™, and others, but the description provided herein is to be understood to extend to other social media platforms, such as FACEBOOK™, TWITTER™, INSTAGRAM™, LINKEDIN™, or any other social media platform where users can post and share information related to events.

Some of the social media posts represent references to news stories related to the city, such as posts 610, 620, and 630. Some of the social media posts representing references to news stories link directly to another webpage external from the social media platform, including webpages of traditional media outlets reporting the story, as shown with posts 610 and 630. Such social media posts can be analyzed in the manner described above in FIG. 5.

Other posts referencing news stories include discussion posts which discuss an event but which do not link to an external webpage, such as post 620. Such social media posts may not be organized in the same manner as the media web pages described in FIG. 5, but such posts can still be analyzed in a similar manner.

Still other posts, such as post 640, do not represent references to news stories. Analysis of such posts can determine that such posts do not propose facts to be verified. Such posts can thereby be removed from any further analysis.

Certain posts may include references to locations, indicated as location references 612, 622, 624, 632, and 642. Some of such location references may indicate that there are factual propositions which are verifiable by responders in the vicinity of that location, whereas others may not. For example, with reference to post 610, the location indicated by location reference 612, Hamilton, may be observed to have been vandalized, which can be confirmed by a responder in the vicinity of the location. As another example, with reference to post 620, the location reference 622 makes reference to a location, but not in a manner in which an event is proposed to have occurred which can be verified. On the other hand, location reference 624 indicates a factual proposition which may be verified by responders at the location. Thus, a request for verification that the prime minister wore particular articles of clothing can be verified in India, not in Toronto. The event verification server 140 can run an event verification engine configured to discern factual propositions which are confirmable by responders in a vicinity of a location from those which are not, and can be tuned according to a particular confidence level.

Several different algorithms for determining whether a particular social media post is to be designated for verification can be applied. As one example, where it is determined that several social media posts relate to the same potential event, and the number of posts reporting the same potential event is beyond a threshold, the potential event can be designated for verification. Another example includes comparing statistical indicators such as votes, upvotes, points, or other scoring systems used to indicate the popularity of a social media post. Where a social media post receives a particularly high scoring relative to other posts on the social media platform, the potential event can be designated for verification. Such scoring systems include upvote tally 614, which indicates that a significant proportion of users of the social media platform consider post 610 to be important.

Figure 7:
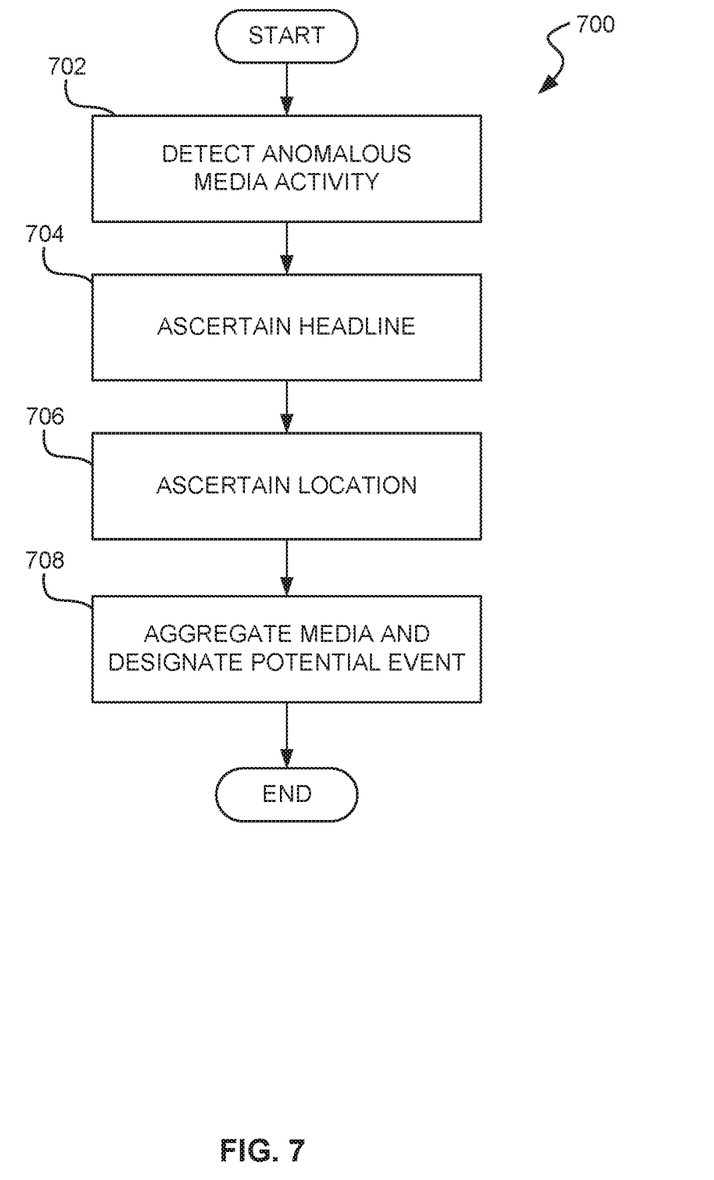
FIG. 7 is a flowchart of a method for identifying a potential event, according to a non-limiting embodiment.

FIG. 7 is a flowchart of a method 700 for identifying a potential event, according to a non-limiting embodiment. Briefly, anomalous media activity is detected, and a request is generated to solicit information regarding the activity. The method 700 can be understood as an example of how block 204 of method 200 can be performed. Although the method 700 can be understood to be performed by the event verification server 140, this is not limiting, and the method can alternatively be performed by other systems and/or devices. Further, it is to be emphasized, however, that the blocks of method 700 need not be performed in the exact sequence as shown. The method 700 may be instantiated be instantiated in a non-transitory machine-readable storage medium executable by a processor of a computing device.

At block 702, anomalous media activity is detected. As discussed above with respect to FIGS. 5 and 6, media posts and social media posts are analyzed for particularly popular or important content. For example, several different media outlets publishing online news articles regarding what is determined to be the same potential event, or a particularly high scoring social media post, can constitute detection of anomalous media activity.

At block 704, headlines of media events are ascertained. As discussed above with respect to FIGS. 5 and 6, media posts and social media post headlines are analyzed to extract particular factual propositions.

At block 706, locations of events reported in the media activity is ascertained. As discussed above with respect to FIGS. 5 and 6, media posts and social media post headlines are analyzed to extract location information.

At block 708, having analyzed headlines and locations of media activity, like media is categorized as relating to the same potential event, within a given confidence interval, and a single potential event is designated.

Having designated a potential event with such information capable of verification, a solicitation request can be generated, such as the requests described in FIGS. 4A-4B.

Figure 8:
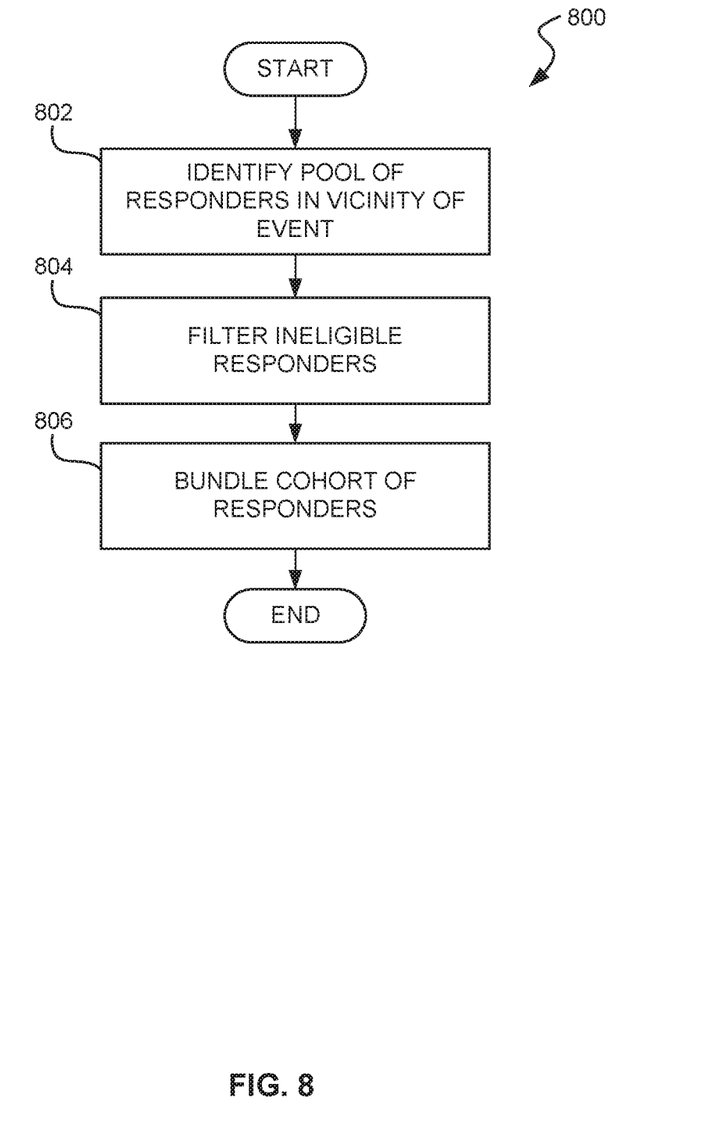
FIG. 8 is a flowchart of a method for selecting recipients to receive solicitation requests, according to a non-limiting embodiment.

FIG. 8 is a flowchart of a method 800 for selecting recipients to receive solicitation requests. Briefly, a cohort of eligible responders is filtered from a larger pool of responders. The method 800 can be understood as an example of how block 208 of method 200 can be performed. Although the method 700 can be understood to be performed by the event verification server 140, this is not limiting, and the method can alternatively be performed by other systems and/or devices. Further, it is to be emphasized, however, that the blocks of method 800 need not be performed in the exact sequence as shown. The method 800 may be instantiated be instantiated in a non-transitory machine-readable storage medium executable by a processor of a computing device.

At block 802, a pool of responders within a vicinity of an event is identified. The relevant vicinity necessary for observation and for verification of information relating to an event can vary depending on the nature of the potential event. Events which occupy a larger physical space, such as weather, earthquakes, stellar events, or even large explosions or large gatherings of people, may be observed within a relatively large vicinity. Other events, such as an author engaging in a book-signing at a small book store, may only be observable from within a relatively smaller vicinity. Thus, the vicinity within which a pool of responders can be selected is to be understood to be dynamic and can vary depending on the nature of the potential event. The vicinity can be determined according to pre-determined categories, or can be dynamically determined based on information provided through media feeds. For example, the vicinity of an earthquake may be determined based on the reported magnitude of the earthquake on the Richter scale.

Furthermore, it is to be understood that a responder device being within a vicinity of an event is not necessarily binary. Responders which are nearer in vicinity to the potential event may be preferred for selection over responders which are further in vicinity from the potential event. The relevant vicinity may be expanded or contracted depending on the number of responder devices near the potential event.

At block 804, ineligible responders are filtered from the selection of responders. Ineligible responders can be filtered from the selection in several ways. As a first example, responders can be assigned credibility scores based on past activity in verifying or submitting potential events, and can be removed from consideration if their credibility score has dropped below a threshold. As another example, responders may submit credentials indicating a particular expertise or degree of reliability, such as, for example, the responder's occupation as an emergency responder, journalist, police officer, medical professional, or other credential which may render the responder particularly well-suited to respond to particular events. As another example, responders can be removed from consideration if their associated responder device is determined to likely be engaging in location spoofing. A responder device which appears to be in the vicinity of a potential event at the current time, but which appears to have been thousands of miles away mere hours ago, is likely engaged in location spoofing, and can be removed from consideration. As another example, a responder who submitted a potential event may be removed from consideration for verifying that event. As another example, a responder who has recently contributed to the verification of a certain event may be afforded a waiting period during which such responder will not receive additional requests for further verification of other information.

At block 806, a cohort of eligible responders is bundled for inclusion in a selection of responders selected to receive a solicitation request. The number of eligible responders which survived filtering at block 804 may be greater than the number of responders reasonably necessary to verify a particular piece of information. Thus, only a subset of eligible responders is selected as a cohort of eligible responders which will receive a particular request. Other eligible responders may be selected to verify other information, such as particular details, or to provide updates, relating to the potential event. For example, a first cohort of responders may be requested to verify the occurrence of a potential event. A second cohort of responders may be requested to verify a particular detail of the potential event, such as to provide a photo. A third cohort of responders may be requested to provide an update on the potential event after a duration of time.

Eligible responders which are not filtered from selection based on criteria such as credibility, location, or other criteria, can be considered reliable sources for verifying information related to an event. Where a sufficient number of such reliable sources verify a piece of information, the information can be considered verified within a given level of confidence. Where different cohorts of reliable sources independently verify an event, provide details, and provide updates relating to an event, confidence that the information provided increases.

Figure 9:
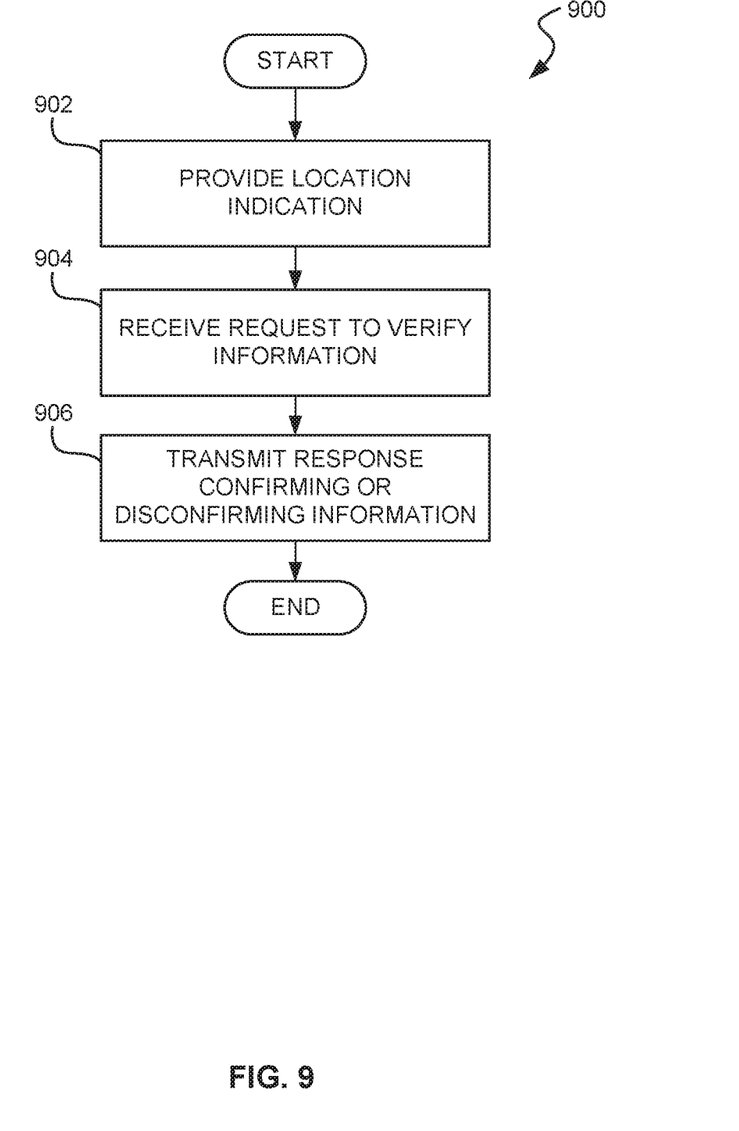
FIG. 9 is a flowchart of a method for providing information to verify information related to an event, according to a non-limiting embodiment.

FIG. 9 is a flowchart of a method 900 for providing information for verifying information related to an event. The method 900 can be understood as an example of how a responder device 162 of FIG. 1 interacts with a computer system such as an event verification server 140 of FIG. 1 according to a method for verifying information related to an event, such as the method 200 of FIG. 2, and reference may be made to the description thereof for simplicity. However, this is not limiting, and the method 900 can alternatively be performed by other systems and/or devices. Further, it is to be emphasized, however, that the blocks of method 900 need not be performed in the exact sequence as shown. The method 900 may be instantiated be instantiated in a non-transitory machine-readable storage medium executable by a processor of a computing device.

At block 902, an indication of a location of a computing device is provided to to a computer system. For example, a responder device 160 provides the location of the responder device 160 to event verification server 140. At block 904, a request to verify information is received at the computing device. For example, a request 170 from event verification server 140 is received at the responder device 160 to verify information related to the event 110. Where the responder device 160 includes a display device, a potential location of the potential event and a solicitation to verify information related to the potential event may be displayed at the display device for viewing by the responder 162. At block 906, a response to the computer system is transmitted confirming or disconfirming the information. For example, a response is transmitted to the event verification server 140 to confirm or disconfirm the information related to the event 110. The request may include a request to capture an image of the potential event. In such a case, the response may include the image captured.

Thus, it can be seen that a system for verifying information relating to events is provided. Information gathered from media feeds is analyzed to detect individual potential events, and information is solicited from reliable responders capable of providing direct evidence of the event. An event verification server capable of receiving and processing such media feeds can detect potential events and obtain verification of the events more quickly than existing forms of fact-checking, which require human analysis and mobilization to gather direct evidence of events. The system leverages the widespread availability and distribution of smart devices around places where events occur to facilitate speedy on-the-ground fact-checking of events reported online.

Variations to the above embodiments are also contemplated. For example, although in the examples provided above, the event verification server generates requests for human users using responder devices to provide information relating to the event, it is also contemplated that the event verification server can also generate requests to other electronic devices in the vicinity of the event, which may respond automatically without human direction. For example, a request may be sent to a nearby security camera to orient itself toward the event to gather information. Further, although in the examples provided above, the event verification server communicates with responders to verify information which may have been provided by a media reporter, it is also contemplated that the event verification server can be in communication with, and work with, media reporters, in the alternative or in addition to the media reporter's communication with other media systems.

The scope of the claims should not be limited by the embodiments set forth in the above examples, but should be given the broadest interpretation consistent with the description as a whole.

The invention claimed is:

1. A method of confirming or disconfirming a potential event from received media feed information comprising:
 a) receiving media feed information comprising one or more media feeds generated from one or more devices, wherein each device is associated with a media reporter;
 b) analyzing the media feed information to determine whether the information identifies a potential event and, if a potential event is identified, deriving one or more locations relevant to the potential event;
 c) identifying one or more eligible responders located in a vicinity of the potential event;
 d) selecting some or all of the one or more eligible responders;
 e) soliciting a request from the selected eligible responders to confirm or disconfirm the potential event as an actual event via system-generated information dispatched to a device associated with each of the selected eligible responders;
 f) receiving a response from some or all of the selected eligible responders via each responder device;
 g) evaluating whether a received response provides information confirming or disconfirming that the potential event is an actual event; and
 h) generating information associated with whether the potential event is or is not the actual event.

2. The method of claim 1, wherein the media feed information analysis comprises review of a plurality of media posts or social media posts generated from different media reporters.

3. The method of claim 1, wherein the one or more media feeds comprise social media posts generated on a social media platform.

4. The method of claim 1, wherein the one or more media feeds comprise social media posts, and the identification of a potential event is generated when a number of social media posts associated with the potential event exceeds a threshold number of received posts, thereby generating a detection of anomalous media activity in the media feed information.

5. The method of claim 1, wherein the media feed analysis includes system-generated evaluation of each of the one or more media feeds to derive either or both of factual propositions and locations associated with the potential event.

6. The method of claim 5, wherein the derived factual propositions and locations are configured for use in generation of a request confirming or disconfirming that the potential event is an actual event.

7. The method of claim 1, wherein the system is configured to automatically generate the request to the device associated with each of the selected eligible responders.

8. The method of claim 1, wherein the request is provided via a system-generated text message to the device associated with each of the selected eligible responders.

9. The method of claim 1, wherein the media feed information analysis includes for a media reporter determination of one or more of:
 a) an identity;
 b) an account identifier;
 c) a credibility score; or
 d) a location of a device from which the media feed was generated.

10. The method of claim 1, wherein the eligible responder selection is conducted by first identifying a pool of potential responders and generating a list of eligible and ineligible responders.

11. The method of claim 10, wherein a potential responder is identified as an eligible responder by one or more of:
 a) assigning of a credibility score based on past activity;
 b) submission and acceptance of credentials indicating an expertise or degree of reliability; or
 c) confirming that a device associated with the potential responder is actually proximate to the potential event in need of verification.

12. The method of claim 10, wherein a pool of eligible responders is grouped according to a proximity of each to the potential event, and wherein an eligible responder having a closer proximity to the potential event is selected prior to an eligible responder having a proximity farther from the potential event.

13. The method of claim 1, wherein a media reporter providing a social media post as media feed information associated with the potential event is designated as an ineligible responder.

14. The method of claim 13, wherein the media feed information comprises a plurality of social media posts generated from devices located at a plurality of different locations, and the potential event is identified as occurring at the plurality of different locations.

15. The method of claim 1, wherein the request to a selected eligible responder includes a request for generation of one or more of an image, video, or sound recording taken proximate to a location identified as relevant to the potential event.

16. A method of confirming or disconfirming a potential event from received media feed information comprising:
 a) receiving media feed information comprising a plurality of social media posts generated from a plurality of devices, wherein each device is associated with a media reporter;
 b) analyzing the media feed information to determine whether the information identifies a potential event and, if a potential event is identified, deriving one or more locations relevant to the potential event;
 c) identifying one or more eligible responders located in a vicinity of the potential event;
 d) selecting some or all of the one or more eligible responders;
 e) soliciting a request from the selected eligible responders to confirm or disconfirm the potential event as an actual event via system-generated information dispatched to a device associated with each of the selected eligible responders;
 f) receiving a response from some or all of the selected eligible responders via each responder device;
 g) evaluating whether a received response provides information confirming or disconfirming that the potential event is an actual event; and
 h) generating information associated with whether the potential event is or is not the actual event.

17. The method of claim 16, wherein the request is generated when a number of social media posts associated with the potential event exceeds a threshold number of received posts, thereby generating a detection of anomalous media activity in the media feed information.

18. The method of claim 16, wherein the media feed information analysis includes system-generated evaluation of each of the plurality of social media posts to derive either or both of factual propositions and locations associated with the potential event.

19. The method of claim 18, wherein the derived factual propositions and locations are configured for verification in the dispatched request to the device associated with each of the selected eligible responders.

20. The method of claim 16, wherein a system is configured to automatically generate the request to a device associated with a selected eligible responder.

21. The method of claim 16, wherein a user providing a social media post as media feed information associated with the potential event is designated as an ineligible responder.

\* \* \* \* \*